Figure 1:
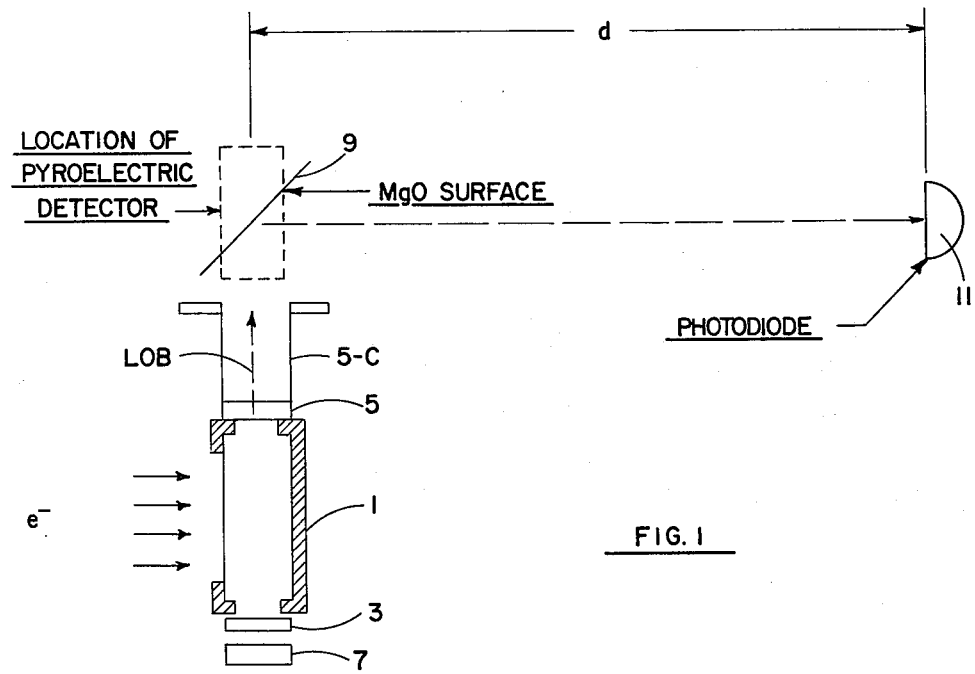

United States Patent [19]
Olson et al.

[11] 3,970,964
[45] July 20, 1976

[54] HIGH-POWER ARGON/NITROGEN TRANSFER LASER

[75] Inventors: N. Thomas Olson, Los Angeles; Earl R. Ault, Rolling Hills Estates; Mani L. Bhaumik, Malibu, all of Calif.

[73] Assignee: Northrop Corporation, Los Angeles, Calif.

[22] Filed: Sept. 5, 1974

[21] Appl. No.: 503,454

[52] U.S. Cl. .................... 331/94.5 G; 331/94.5 PE
[51] Int. Cl.² .......................................... H01S 3/22
[58] Field of Search ..................... 331/94.5; 330/4.3

[56] References Cited
UNITED STATES PATENTS
3,679,997   7/1972   Friedl ............................ 331/94.5 G OTHER PUBLICATIONS
Basov, Laser Focus, Sept., 1972, pp. 45–47.
Nelson et al., Applied Physics Letters, vol. 22, No. 2, Jan. 15, 1973, pp. 79–80.
Searles et al., Applied Physics Letters, vol. 25, No. 1, July 1, 1974, pp. 79–82.

Primary Examiner—Robert J. Webster
Attorney, Agent, or Firm—Edward A. Sokolski

[57] ABSTRACT

A new class of high-power lasers capable of high efficiencies in the visible and shorter wave lengths is taught, employing an excitation energy transfer mechanism from a pumped noble donor gas, such as Argon, to an acceptor lasing gas, preferably Nitrogen. In particular, such an Argon/Nitrogen laser exhibits a very useful, unique output wave length at 3577A, this being derived from a mixture of Argon, predominantly, with a minor percentage of Nitrogen, excited by a relativistic electron beam of relatively high current density. Such gas lasers with a noble gas as donor offer great promise, using high electrical conversion. efficiency of the noble donor gas with a non-radiative energy transfer to the lasing gas.

7 Claims, 3 Drawing Figures

HIGH-POWER ARGON/NITROGEN TRANSFER LASER

BACKGROUND OF THE INVENTION

This invention concerns the field of gas lasers and, more particularly, an Argon/Nitrogen laser, or like mixture of noble gas as donor with certain lasing gases at high pressures and high pumping power.

Those skilled in the art are familiar with gas lasers and their characteristics, beginning with the Helium/Neon laser, the first workable gas laser, where Helium was used to absorb RF pumping energy and transfer it to Neon, which, as the lasing gas, would in turn amplify the energy and cause emission of a laser beam.

Workers in the art have for some time been aware of the high electrical conversion efficiencies exhibited by various noble gases such as Xenon, exemplified in the operation of Vacuum Ultra-Violet (VUV) lasers. But, it has hitherto been unsuspected that Argon, or a like noble gas, could be used in a gas laser to develop an output wave length apt for transmission through an atmospheric "window" (a wave length transmitted through atmospheric gases with little or no attenuation). The subject invention has achieved this goal in a novel Argon/Nitrogen laser able to provide an output wave length apt for such transmission. This laser uses electronic excitation energy transfer from Argon to Nitrogen to produce lasing which indicates the feasibility of a new class of high-power noble gas transfer lasers for the visible and shorter wave lengths.

This invention is especially surprising for several reasons. No one has ever before made Argon/Nitrogen mixtures lase in a practical fashion, though some have tried. Apparently, no one ever used Argon (or a like noble donor gas) at a high enough concentration and energy to avoid the well-known "bottle-necking" problem. Indeed, from a theoretical viewpoint, the transfer mechanism and resulting laser action necessary for this did not appear encouraging. Indeed, workers experimenting with Argon/Nitrogen mixtures have asserted they would not lase because energy transfer seemed to favor lower energy levels of the medium — rather than higher levels as lasing would require. However, systems according to the invention have achieved this startling result, with the equally-surprising result of producing a new 3577A output with some very unique properties and utility.

As more particularly described in the Example and embodiments below, this invention opens the way to a new family of noble-gas donor lasers for producing such results at high pressure. For instance, about seven atmospheres of Argon mixed with only 0.5 atmosphere Nitrogen and exited by a 1.3 MeV electron beam (average current density of 300 amp/cm$^2$) can produce a very strong laser output (peak power at one-half megawatt or more with reasonable efficiency of about 0.2%). Further, much higher output power and efficiencies (up to a few percent) are indicated. That is, where a conventional low-pressure $N_2$ laser might exhibit a saturation power of about 2 kw/cc, such an Ar/$N_2$ laser, according to the invention, can produce a saturation power of about 10 kw/cc. This is believed explained, in part, by a higher rate of collision depopulation of the terminal laser level at higher pressures.

OBJECTS, FIGURES

Accordingly, it is an object of this invention to answer at least some of the foregoing problems and difficulties and to provide at least some of the foregoing features and advantages. A more particular object is to do so, providing a gas laser comprising a first gas, subject to an inability to lase under prescribed conditions, together with an additive gas adapted to be excited and to transfer sufficient energy to the first gas to induce lasing thereof. Another object is to do so by adding such a gas in such concentrations and, as excited sufficiently, to produce such lasing. A related object is to do so such as to relieve bottle-necking of the first gas. Yet another object is to do so such as to induce sufficient "population inversion" and "energy pooling" of said first gas and thereby generate a substantial lasing output.

A further object is to do this providing a laser output characterized by a wave length substantially unaffected by transmission through atmosphere. Yet another object is to do this generating a laser output at a prescribed, unique wave length in the visible and shorter spectrum. A still further object is to do so adding at least one "noble" gas. Yet another object is to do so adding Argon. Still another object is to do so adding a relatively high, predominant concentration of Argon, at least several times that of the first gas. Yet a further object is to do so with electron beam excitation at high current density.

Still another object is to do so, adding sufficient excited Argon as to favor increased population of the C energy state of the first gas, while also favoring depopulation of its lower states. Yet a further object is to do so providing relativistic electron beam excitation of Argon at relatively high power and high Argon partial pressure. Another object is to do so also providing a laser cavity of a relatively modest size and prescribed "gain-length." Still another object is to do so with an additive gas that efficiently absorbs electron collision excitation energy and effectively transfers it to the first gas.

Yet another object is to do so wherein the first gas constituent comprises a molecular gas like Nitrogen, Oxygen or oxides of Nitrogen and Carbon. Still another object is to do so providing such gases in very pure form. Yet another object is to do so in an Argon-Nitrogen laser. Still a further object is to do so with Argon at several times the concentration of Nitrogen or more. Yet a further object is to do so wherein the total absolute gas pressure is on the order of 100 psi or more, with Argon present in at least 70 weight percent concentration. Still another object is to do so wherein said Nitrogen weight concentration is on the order of 1 to 15 weight percent.

Figure 3:
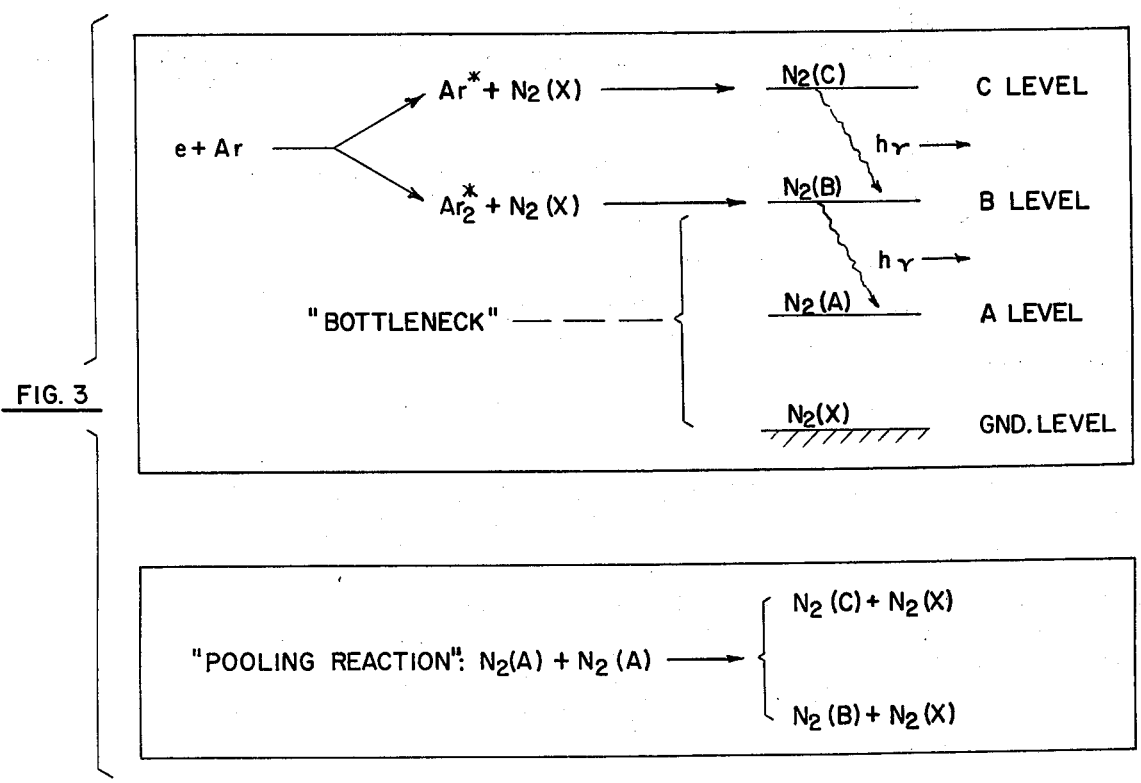
Figure 2:
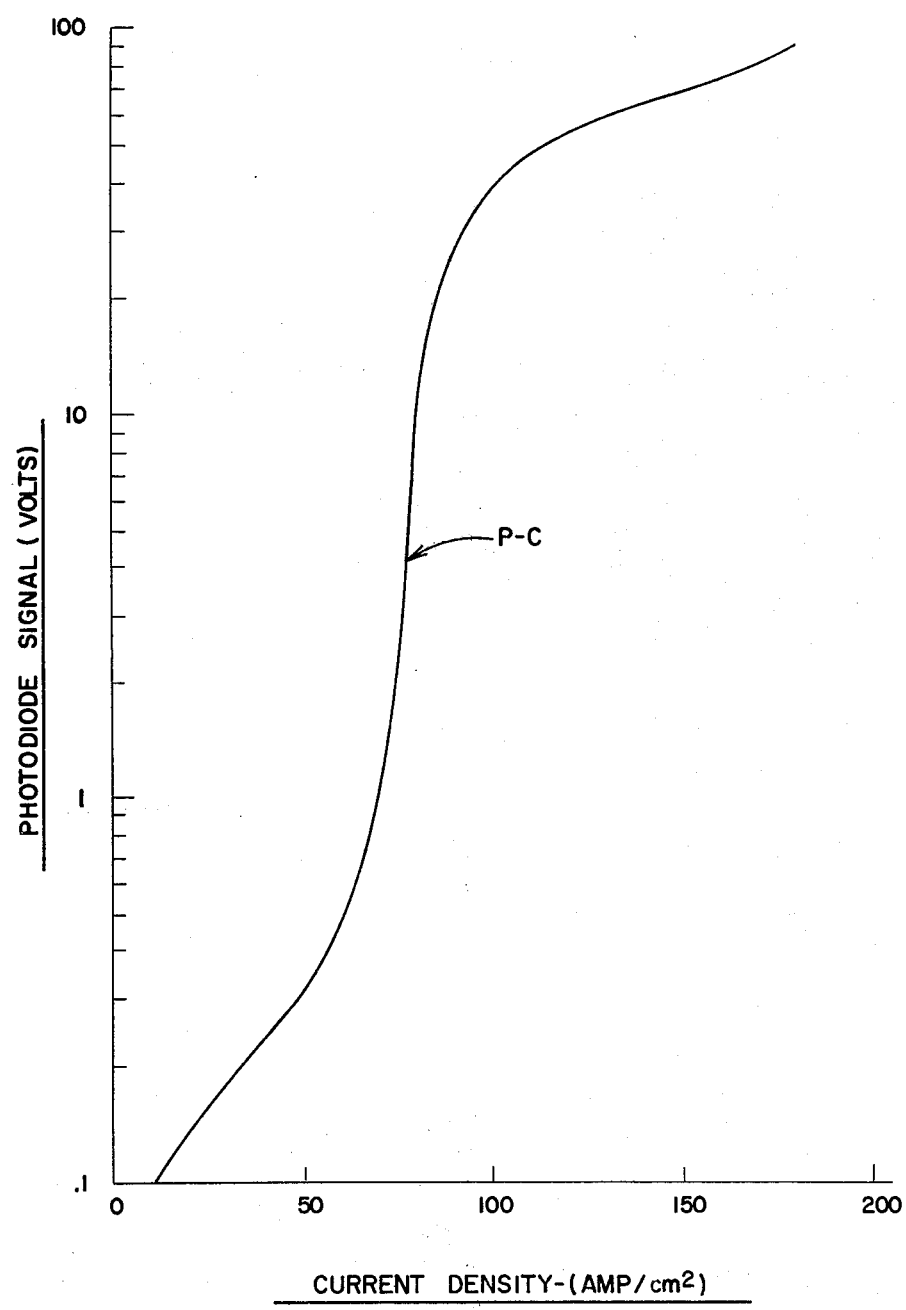

Further objects and advantages will become apparent to those skilled in the art upon consideration of the following detailed description of the invention including its product and application, in conjunctin with the accompanying drawings wherein, with the reference numerals denoting like elements:

FIG. 1 comprises a very schematic line drawing of a gas laser arrangement apt for use with the described embodiment;

FIG. 2 represents a plot for such an embodiment of current density versus gas pressure (output intensity); and FIG. 3 is a highly schematized "energy level diagram" indicating the transfer of excitation energy from Argon to Nitrogen particles at various energy levels and subsequent energy shift.

SUMMARY OF THE INVENTION

The subject invention points the way to a new class of high-power lasers using excitation energy transfer from Argon, or like noble donor gas, to Nitrogen, or like molecular acceptor lasing gas, to produce output in the visible and shorter wave lengths. For instance, it is apparent that any noble donor gas (from Helium through Xenon) may be added to an acceptor gas like $N_2$, $N_2O$, $CO$, $CO_2$ or $O_2$, to produce such a result. But one must use a relatively high total system pressure, with the noble gas the major constituent, as well as a relatively high pumping power to achieve such results (i.e., current density must be high with a reasonable cavity length assumed, such as in the preferred embodiment where a 10 cm length — 2 cm diameter cavity was used).

Such an approach apparently provides a means of circumventing the well-known bottle-necking problems, as explained below. More particularly, if pumping is energetic enough and Argon concentration high enough, sufficient population of excited Argon (atoms and molecules) will be available to, in turn, efficiently transfer enough energy to the Nitrogen molecules to excite them so they will achieve a desired population inversion and "lase."

Furthermore, if the total pressure is high enough, the rate of collision depopulation from the lower laser level will be much faster than normal (i.e., than the normal rate of depopulation by a spontaneously radiative transition from this level). This apparently overcomes bottle-necking (caused, as workers will recall, by the relatively slow decay from the B → A laser energy levels and/or from the A → Ground energy levels; as opposed to the relatively rapid decay from C → B energy levels).

Elimination of bottle-necking cannot be effected simply by increasing $N_2$ pressure — to increase the collisional depopulation rate from the lower laser level — since $N_2$ is known to quench the upper level with relatively greater efficiency. Therefore, to achieve the desired results, a mixture of gases is required whereby a donor gas not only helps in alleviating bottle-necking (by increased collisional depopulation of lower levels — given the relatively high pressure prevailing), but also facilitates population of upper laser levels by energy transfer. This is important since otherwise this added (noble) gas would merely be absorbing pumping energy, somewhat counterbalancing the advantages in increasing collisional depopulation, and not providing a significant net increase in efficiency. Of course, as mentioned above, while Argon appears to be an optimum donor gas, other noble gases, such as Helium or Xenon, appear quite workable for certain instances, as well as Krypton and Neon possibly and/or mixtures of these (e.g. Argon/Helium/Xenon).

EXAMPLE I — PRINCIPAL EMBODIMENT — ARGON/NITROGEN

As indicated schematically in FIG. 1, an embodiment of the subject invention is provided as an Argon/Nitrogen laser with the lasing gas mixture being incorporated in the lasing cavity 1 of the gas cell, with a pair of Magnesium Fluoride windows 3, 5 at either end of the cavity defining lasing cavity (gas cell) 1 therebetween and a reflector 7 (92%) is provided outside one end. A Magnesium-Oxide diffuser 9 is provided at the output end so as to scatter some of the output to a photodiode detector 11. As workers in the art will understand, pumping energy is applied via an electron beam arrangement (generally indicated as $e^-$ and not shown in detail, but well understood in the art). Because of the approximate 5% reflection of the Magnesium Fluoride windows, the output window 5 constitutes an output coupler with coupling about 95%. A mirror 9 is aligned (e.g. with He-Ne laser) with the output coupler 5–c arranged to intercept the laser output beam LOB, diverting a portion thereof to photodetect unit 11 for measuring output. A beam splitter temporarily inserted into the optical cavity can assist in alignment.

A suitable electron gun ($e^-$) to excite the high pressure gas cell is a Physics International Model Pulserad No. 110A with a current output of 20 kA at 1 MeV in a 20 ns pulse over an area of 2 cm × 10 cm. Maximum gun current density of about 1 $kA/cm^2$ (with a 3 mil anode foil) gives an effective current density (inside the gas cell, after traversing 4 mils of Titanium and 1 cm of air) of 400$A/cm^2$ at the front of the gas cell, and 200$A/cm^2$ at the back (300$A/cm^2$ average.) Current density is an important parameter in establishing the laser threshold and may be varied by interposing additional scattering foils between the electron gun anode foil and the gas cell. The (diode) gun supply voltage may also vary (here, over a range of 1.3 to 1 MeV). Since the electron range is much larger than the dimensions of the gas cell (the $\Delta E$ is ~35 keV at 100 psia and 1 MeV), small changes in the (relativistic) electron beam energy will not appreciably change the pumping rate.

RESULTS

This embodiment produced high-power laser oscillations in the $N_2$ "second positive band"; attributed mainly to the high Ar pressure; and to the high pumping power. Laser diagnostics were performed, primarily with intensity measurements using the photodiode 11 — here, understood as an ITT Model No. FW114A photodiode. The photodiode signal was measured with a Tektronics 7904 oscilloscope having a 500 mHz vertical amplifier. To prevent the photodiode from saturating, the optical output was attenuated by diffuse scattering from a MgO surface 9, as illustrated in FIG. 1. Gas cell current density was monitored simultaneously with the optical intensity by means of a Faraday probe mounted flush with the rear cell surface. Spectral measurements of the laser output were made with a SPEX "1800" 1-meter Czerny-Turner spectrograph having a dispersion of 10A/mm and the spectral output detected either with a photodiode or by recording on film.

Photodiode and Faraday probe signals were taken from an excited gas mixture comprising: 8% $N_2$ and 92% Ar at 100 psia (total pressure). A temporal narrowing of the optical pulse was evident, the 8 ns FWHM pulse having a rise time of 2 ns, while the electron beam current pulse was ~20 ns (FWHM) wide and rose in ~5 ns. The normal fluorescence pulse followed the shape of the current pulse. The peak of the laser pulse occurred within ±3ns of the current pulse peak.

Further evidence of laser oscillation was obtained by measuring output radiation intensity photo-optically with the total reflector removed and by misaligning the cavity mirrors. In these tests, the intensity decreased by at least two orders of magnitude and there was no temporal narrowing in either case.

Another special feature observed at the higher pressures was a novel laser output wave length; i.e., where a conventional (low pressure) $N_2$ laser oscillates at 3371A, this novel high-pressure Ar-$N_2$ laser embodiment put out a unique 3577A beam!

Analysis shows that efficiencies up to several percent are feasible as well as longer pulse lengths, leading to a truly efficient high energy Ar-$N_2$ laser (e.g. with optimized optics). Also, although this embodiment gives a pulsed output, it can be readily modified to give continuous wave (cw) output as workers will understand.

Parameter of Pumping Power (High-Power E-Beam)

The optical output of the subject embodiment exhibited the chracteristic laser threshold as a function of electron beam current density. Experimental results reflecting this are plotted in FIG. 2, a plot "p-c" of peak photodiode voltage (laser output) versus peak Faraday probe current (pumping power). Below "threshold" (here, about 50–70 amp/cm²), the optical output temporally follows the current pulse, but as current density increases above threshold, a temporal narrowing takes place along with a substantial increase in output intensity. As can be seen from the results in FIG. 2, output intensity increases by two orders of magnitude when the electron beam current density is doubled — a most impressive result!

The total energy output of the laser was measured by a Gentec Model No. ED200'' integrating pyroelectric detector. The highest energy measured was 4 mJ, which corresponds to a peak power of 500 kw for a pulse of 8 ns (FWHM). This peak power is consistent with the photodiode measurement after corrections to the geometric attenuation. At the knee in the threshold curve (p-c in FIG. 2), peak power is approximately 300 kw; above this point, laser output appears to be linearly dependent on current density. With the 95% output coupler, the intracavity power is approximately equal to the output power, so that the estimated saturation power is 300 kw; corresponding to a saturation intensity of 100 kw/cm². This is considerably higher than the saturation intensity reported elsewhere (e.g. that D. A. Leonard, "Saturation of the Molecular Nitrogen Second Positive Laser Transition," Appl. Phys. Letters 7, 4 (1965) for a low pressure Nitrogen laser operating in the second positive band.)

An improved saturation power of 10 kw per cc was observed, comparing very favorably to the 2 kw per cc level for a conventional low pressure $N_2$ laser. The increased saturation power is believed to be due to a higher rate of collisional depopulation of the terminal $N_2$ laser level at higher gas pressures.

Output Analysis

Preliminary measurements of beam divergence were made by exposing film at increasing distances from the laser cavity. Measured beam divergence was 10 mrad, compared with a potential geometrical divergence of 60 mrad for a "two-pass" system. This fact, together with the observation that the laser output power was sensitive to the cavity alignment, indicates "multipass laser oscillation." For a laser pulse-width of 8 ns and a cavity length of 12 cm, nearly eight round-trips are possible.

An estimate of lasing efficiency may also be made on the basis of the absorbed electron beam energy. The stopping power of the 100 psia Ar is approximately 16 kv/cm. The total energy absorbed by the 30 cm³ cavity volume during the electron beam pulse (15 ns FWHM) at an average current density of 300A/cm² is calculated to be 2J. Therefore, an output of 4 mJ would represent an efficiency of ~0.2%. However, the indicated basis for this is somewhat crude and experimental, so that efficiency can be expected to be increased considerably beyond this, merely by virtue of customary optimizations.

The fluorescence spectrum of 16 atm $N_2$ showed three lines: 3371A, 3577A, and 3805A. These lines belong to the transition $v' = 0$ of the $C^3\pi_u$ to the $v'' = 0, 1, 2$ of the $B^3\pi_g$ state of the $N_2$ molecule. The same three lines appeared in the fluorescence spectrum of a 15 atm Ar/1 atm $N_2$ mixture, but with considerably higher intensity. This is probably a result of energy transfer, as well as a reduction in $N_2$ self-quenching of the C state.

The laser spectrum primarily consisted of the 0–1 line at 3577A. Photodiode measurements showed that the other two lines were lower in intensity by at least two orders of magnitude. Thus, the spectral study provides further supporting evidence of laser oscillation, as well as corroborating the production of a new 3577A line at relatively high intensity.

Parameter of Total Cavity Pressure

Total cell pressure was varied, using three gas mixes (4%, 8% and 16% $N_2$ with the balance Ar) from 20 psia to 260 psia. The most favorable output was obtained with a pressure of about 100 psia and with a mix of 8% $N_2$/92% Ar. Before filling the cavity with the $N_2$/Ar mix, it was evacuated with a diffusion pump to $2 \times 10^{-5}$ torr, to thereby maintain gas purity level at the 99.99% purity specification of the gas supply.

Laser output as a function of pressure at a constant electron beam current density was also investigated. The peak laser intensity was observed to decrease at pressures higher than 100 psia. The reason for this decrease is not yet clear, since it could stem from a variety of causes: e.g. the decrease in effective current density at higher pressures due to scattering losses, or the reduction in gain by pressure broadening or a higher rate of nonradiative losses.

It was also found that, as might be expected, the gain length (G-L) could be made larger (in which case one might operate at a lower pumping current density) or smaller, though one must be careful not to drop below the threshold G-L value, since oscillation will thereupon cease.

Results Summary

In summary, the experimental results presented above show clear evidence of strong laser oscillation from high pressure Ar-$N_2$ mixtures, pumped relatively hard.

FURTHER EXAMPLES: GAS MIX VARIED

It was found, as mentioned above, that gas pressure was a relatively important parameter and was significant in controlling the results achieved, as indicated below in Table I.

TABLE I

| | Optimum | Lasing Pressures Preferred Range | Feasible Range |
|---|---|---|---|
| Total Pressure (Torr.) | 4200 (100 psia or 7 atm.) | 1400–8400 | 50–50,000 |
| $N_2$ Pressure (wt.%) | 4–8–14 | .1–15 | .1–15 |
| Ar Pressure | Balance | Balance | Balance |

Assume: Ex. I conditions — from 50–100 amp/cm² to 1000 or more, at 1–1.3 MeV; 20+ ns: power at 0.5 m-watt or more with 30 cc cavity.

REVIEW OF FACTORS

Some important operational parameters for this and related embodiments may be summarized as follows:

a. Argon Pressure and Excitation

Sufficient excited Argon is provided to produce the necessary $N_2$ population inversion and, in effect, reduce the B → A decay time of $N_2$ (from about 10,000 nano-seconds to about 1 nano-second). This, in effect, increases the rate of energy transfer to the C state (via A to C pumping, FIG. 3) to produce the population inversion (between the C and B states).

The selection of Argon as an energy (electron beam) absorption medium is, of course, an optimum one here, though other noble gases will give similar (though less efficient in most cases) results. Of course, the input pumping energy from the electron beam source must be sufficient to excite the Argon sufficiently to, in turn, transfer enough energy to the Nitrogen to excite it as described.

A major novel feature in addition to high pumping energy is the very high (partial) pressure of Argon needed to *transfer* this energy to the $N_2$ and thus "pump" it to the indicated electron transition. The kinetics of Argon gas and its excited energy level are very well matched to those of (ground-state) Nitrogen, and thus favor the desired results — but it was not necessarily appreciated how favorable this was until tests were run; whereupon the discovery was that the necessary Argon concentration was on the order of 10 to 50 times that of Nitrogen — something quite surprising and new in the art.

b. Concentration of Nitrogen

It is also important to have at least a minimum amount of $N_2$ (along with the minimum current density to energize the Argon) so as to relieve any bottle-necking and increase overall quantum efficiency.

In this respect, note the diagram of energy levels and transfer mechanisms in FIG. 3. Here, the pumping energy (from electron beam to Argon: "$e + Ar$" will be understood as exciting the Argon — either monatomic (Ar*) or molecular (Ar*$_2$), which, in turn, may transfer some of its excitation energy to Nitrogen in the ground-level state [$N_2(X)$]. This, then, excited the $N_2$ driving it either to its "C-level" [$N_2(C)$] or its "B-level" [$N_2(B)$], from either of which it will decay, in time, with photon (hv) emission (C → B results in lasing).

Now, the population of the C-state must be kept larger than that of the $N_2(B)$ state and the described Argon excitation and favorably energy transfer to $N_2(X)$ will favor the B and C levels of $N_2$, while it is believed the resulting increased availability of $N_2(A)$ will allow a "Pooling" reaction to the same end (i.e., collision of $N_2(A) + N_2(A)$ raises to B or C levels also).

Thus, to achieve lasing even with higher efficiencies, it is believed that sufficient $N_2$ must be present so that two atoms in the A state may collide with the result that some of them are raised to C state and enable more C → B radiative decay with accompanying release of photon energy (that is, successful lasing). Of course, further $N_2$ decay is B → A and then from A state recirculated (as above) and energized back up to C — the object being to decay faster from C → A than from A → Ground (and relieve bottle-necking too).

Similarly, another important parameter is impurity concentration. For instance, Oxygen or NO in very small concentrations can sufficiently favor the A → Ground transition to prevent successful lasing. It has also been found that adding a mere 1% NO (with about 8% $N_2$ and the balance Argon) can totally suppress lasing. Of course, there is alternatively, the possibility of making NO, itself, lase (rather than $N_2$, as above) at the same energy level in a modified system — as workers in the art will understand.

The effects of high concentration of noble gas (Argon) and increased current density are summarized below in Table II, for embodiments like the above and those related.

TABLE II

3577A Lasing — High Pressure Argon/Nitrogen; High i/cm²

| | |
|---|---|
| $N_2$ alone at 15 Atm. and 50 amp/cm² → fluorescence at | 3371A<br>3577A<br>3805A |
| $N_2$+Ar (1:16 Atm.) and 50 amp/cm² → brighter fluorescence at | 3371A<br>3577A<br>3805A |
| $N_2$+Ar (1:16 Atm.) and 150 amp/cm² → lasing for 3577A | |

USES

A variety of very interesting applications will be possible with lasers like those described. The 3577A beam (between the visible violet and the vacuum-ultra-violet) is surprisingly non-absorbed by any atmospheric gas, even ozone. With the output beam outside the ozone absorption band, atmospheric transmission with practically no absorption losses is enabled; transmission being limited only by Rayleigh scattering. This is most striking, and workers will appreciate how unique it is. A compact laser-radar, as well as other associated communication systems, will be made feasible. Such uses have long been dreamt of (e.g. for high-speed data transmission where hitherto atmospheric absorption has been a severe limitation. Until recently, it was believed that a 20 to 30 mile laser beam transmission was the maximum achievable through atmosphere — in good weather! Such strained expedients as a continuous "light pipe" conduit were even contemplated to avoid atmospheric absorption. It also happens that detectors were quite sensitive to this novel wave length and that the typical atmospheric boundary layers to not distort or adversely affect it.

Related applications are for: missile tracing (e.g. for "deep space"), aircraft landing systems (e.g. laser radar, usable in bad weather), detection and measurement systems for gyrosystems, even pollution detection systems. Also, the novel wave length is about 1/15 that of a CO laser and thus can be focused about 200 times "tighter." Also, this 3577A wave length is much easier to modulate (e.g. for information transmission), than the longer, conventional output wave lengths; also, it is suitable for stimulating certain chemical processes.

This Ar-$N_2$ laser can also be used to pump "dye lasers," thereby effectively shifting output wave length to any desired value in the visible, and some shorter, wave lengths. Since dye lasers have high quantum efficiency, the overall efficiency of such a system will be quite high. Such sources will also be very useful in a wide variety of photochemical processes, such as the development of efficient methods of isotope separation and wave-length-selective photochemical synthesis.

A very significant application of the Ar-$N_2$ laser is in plasma heating by inverse "bremsstrahlung" absorption for the generation of efficient x-ray point sources; another is for stimulating controlled thermonuclear fusion. Although there are now efficient "infrared" laser sources available at 5 and 10$\mu$, radiation at these wave lengths is reflected by a high density plasma. The output wave length of the Ar-$N_2$ laser is considered to be near the optimum wave length desirable for inertially confined plasma heating to achieve thermonuclear fusion.

Similarly, such lasers appear apt for x-ray generation. That is, as opposed to using an electron beam to bombard an x-ray target and produce x-rays, the subject laser with its high quantum efficiency can be used (e.g. to bombard an iron target or the like) to produce x-rays with greater efficiency and without the "soft" ray output now common (conventional Bremmstrahlung). Efficiencies on the order of 20% appear feasible, versus about 1% with conventional electron bombardment.

CONCLUSION

A new class of lasers is taught herein, using Argon, or a like "donor-gas" additive, in high concentration, and pumped hard, for transfer excitation of Nitrogen or a like acceptor lasing gas — especially to relieve bottle-necking. Such molecular gases as CO, NO, $N_2O$ and $CO_2$ are also suitable acceptor lasing subjects, as are polyatomic gases.

The donor gas must, obviously, be a good, efficient absorber of the pumping energy (e.g. from electron collisions) and be efficient in transfering the energy to the acceptor gas (e.g. $N_2$). Xenon will be understood as another favored donor gas candidate, having an especially high-efficiency for converting electricity to light (efficiency of about 60% at low temperatures).

Thus, such a donor additive gas would serve not only to increase population inversion (by enhanced pumping of upper level acceptor gas and depopulation of its lower levels), with its increased pressure and high excitation (with its excellent energy transfer capability) — counterbalancing contrary tendencies of acceptor gases like $N_2$ and alleviating bottle-necking — but, further, act to facilitate energy pooling of the $N_2$, with a further increase in efficiency.

What is claimed is:

1. A gas laser having an output at 3577A comprising:
   means for forming a resonant optical path for stimulating a coherent beam of radiation at,
   a gas cell positioned in said optical path,
   a lasing gas mixture in said cell having a total absolute pressure of 20 psia – 260 psia, and comprising 4–16% nitrogen and the balance argon,
   means for exciting said gas mixture to create a population inversion between the upper and lower energy levels of the 3577A transition of nitrogen by both populating said upper energy level and depopulation said lower energy level via collisions between argon and nitrogen so as to form an oscillating laser light beam at 3577A in said resonant optical path, and
   means for coupling a portion of said beam out of said path to provide said output.

2. The gas laser of claim 1 wherein the means for exciting the gas mixture comprises an electron beam.

3. The gas laser of claim 1 wherein the total absolute pressure of the gas mixture is approximately 100 psia.

4. The gas laser of claim 3 wherein the mixture comprises approximately 8% nitrogen and 92% argon.

5. The laser of claim 1 wherein the gas mixture comprises approximately 8% nitrogen and 92% argon.

6. The laser of claim 1 wherein the gas mixture comprises approximately 4% nitrogen and 96% argon.

7. The laser of claim 1 wherein the gas mixture comprises approximately 16% nitrogen and 84% argon.

* * * * *

UNITED STATES PATENT AND TRADEMARK OFFICE
CERTIFICATE OF CORRECTION

PATENT NO. : 3970964
DATED : July 20 1976
INVENTOR(S) : N. THOMAS OLSON, EARL R. AULT, MANI L. BHAUMIK It is certified that error appears in the above-identified patent and that said Letters Patent are hereby corrected as shown below:

In Claim 1, Column 10, Line 20: At end of line, after "at", add "3577A"

Signed and Sealed this

Twelfth Day of October 1976

[SEAL]

Attest:

RUTH C. MASON
*Attesting Officer*

C. MARSHALL DANN
*Commissioner of Patents and Trademarks*